Figure 1:
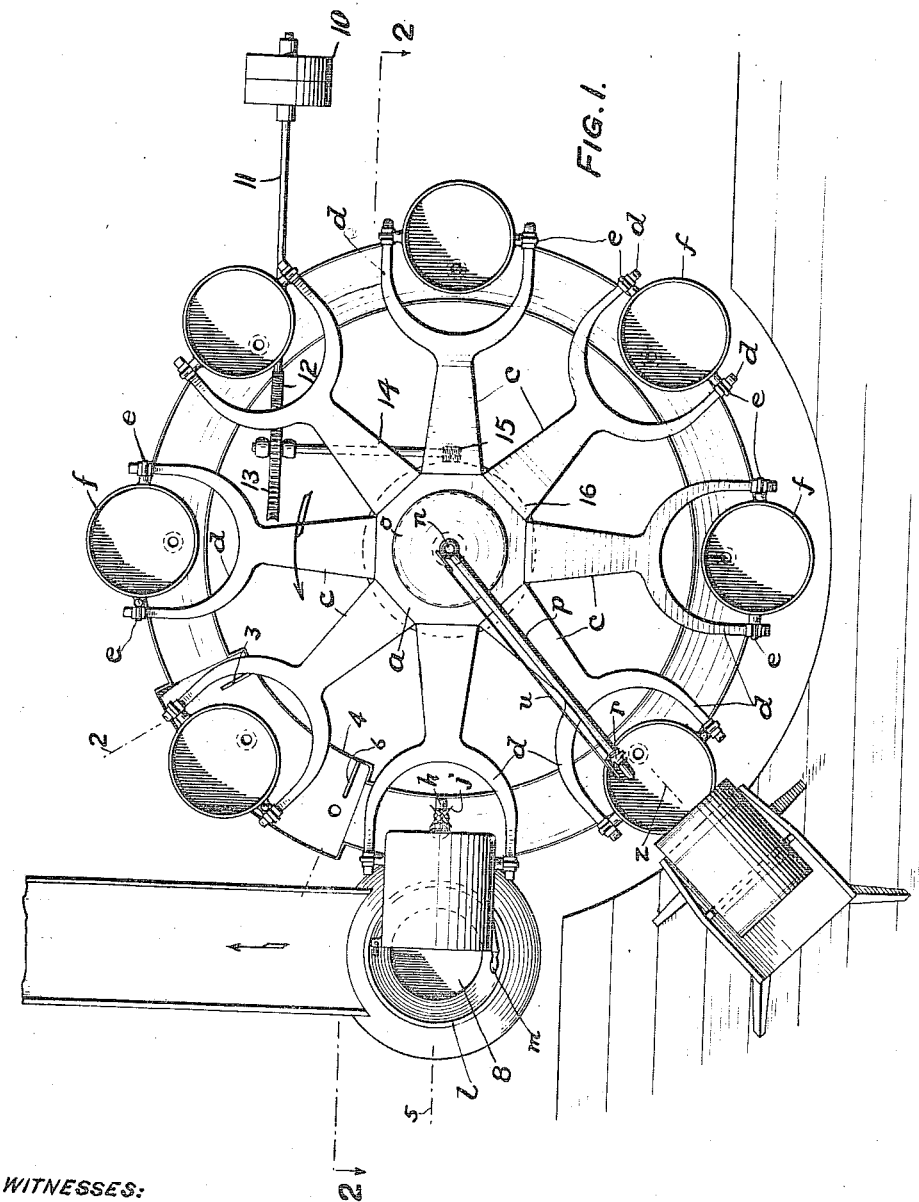

A. F. DU PONT & J. T. THOMPSON.
APPARATUS FOR NITRATING CELLULOSE.
APPLICATION FILED JAN. 8, 1910.

979,560.

Patented Dec. 27, 1910.
2 SHEETS—SHEET 1.

WITNESSES:
E. E. Wall
Daniel Webster, Jr.

INVENTORS:
Alexis Felix du Pont
John Torbert Thompson
BY
Harding & Harding
ATTORNEYS.

A. F. DU PONT & J. T. THOMPSON.
APPARATUS FOR NITRATING CELLULOSE.
APPLICATION FILED JAN. 8, 1910.
979,560.
Patented Dec. 27, 1910.
2 SHEETS—SHEET 2.
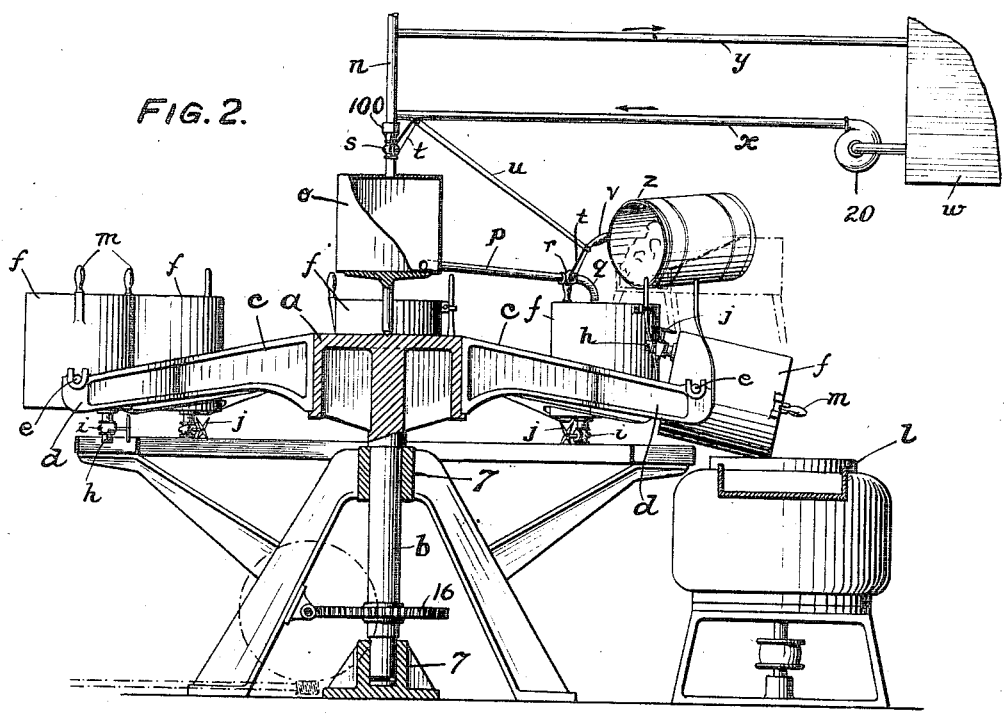
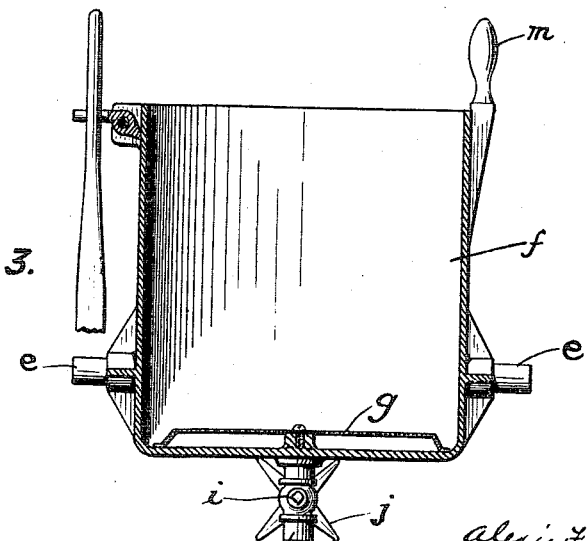
WITNESSES:
INVENTORS:
Alexis Felix du Pont
John Torbert Thompson
BY
ATTORNEYS

UNITED STATES PATENT OFFICE.

ALEXIS FELIX DU PONT AND JOHN TORBERT THOMPSON, OF WILMINGTON, DELAWARE, ASSIGNORS TO E. I. DU PONT DE NEMOURS POWDER COMPANY, OF WILMINGTON, DELAWARE, A CORPORATION OF NEW JERSEY.

APPARATUS FOR NITRATING CELLULOSE.

979,560.  Specification of Letters Patent.  Patented Dec. 27, 1910.

Application filed January 8, 1910. Serial No. 537,054.

*To all whom it may concern:*

Be it known that we, ALEXIS FELIX DU PONT and JOHN TORBERT THOMPSON, citizens of the United States, residing at Wilmington, county of Newcastle, and State of Delaware, have invented a new and useful Improvement in Apparatus for Nitrating Cellulose, of which the following is a full, clear, and exact description, reference being had to the accompanying drawings, which form a part of this specification.

The object of our invention is to provide an apparatus in which the nitration of cellulose, for instance, cotton, may be carried on in small quantities and continuously. By this means the nitrating is carried on more rapidly than by the apparatus now in use, and the material being divided up into small units, any spontaneous combustion affects but a small quantity.

We will first describe the embodiment of our invention illustrated in the accompanying drawing, and then point out the invention in the claims.

In the drawings: Figure 1 is a plan view. Fig. 2 is a section on line 2—2, Fig. 1. Fig. 3 is a detail sectional view of nitrating vessel.

*a* is a platform rotatably mounted upon the spindle *b* in bearings 7. This platform is revolved at a slow rate of speed, preferably one revolution in twenty minutes. It is driven from the pulley 10 through shaft 11, having worm 12 operating the reducing worm wheel 13 on shaft 14, on which is worm 15 opening reducing worm wheel 16 on a spindle *b*. Projecting from this platform *a* are the arms *c*, each having the jaw or bifurcated ends *d*. Supported by trunnions *e* in each of these jaws *d* is a nitrating vessel *f*. This vessel has above its bottom a screen *g*. In the bottom is an opening from which projects a pipe *h* having a valve *i* therein, operated by a star wheel *j*. Upon the ground or floor, and adjacent to the projecting arms of the platform at one point is a centrifugal extractor of the ordinary character, composed of the casing *l* and the rotating basket 8. Attached to each of the vessels *f* is a handle *m*.

Supported centrally of the platform *a*, is the pipe *n*, extending above the level of the reservoir *w*. This pipe *n* terminates in the measurer *o* of size sufficient to hold a quantity of nitrating liquid for one vessel *f*. From this measurer *o* extends the pipe *p* having the faucet or mouth *q*. The pipe *n* is formed of two sections swiveled together at the point 100. On the pipe *p* is a valve *r* and on the pipe *n* a valve *s*. These valves *r* and *s* are oppositely set and their operating levers *t* are connected by rod *u*.

*v* is a handle for operating the levers *t*.

*w* is a reservoir for the nitrating liquid. From this reservoir to the pipe *n* extend the pipes *x* and *y*. Upon the pipe *x* is the circulating pump 20. When the valve *r* is closed and valve *s* opened, the measurer *o* fills up and thereafter the liquid circulates through pipes *x* and *y*. When the valve *r* is opened, valve *s* is closed, the liquid in measurer passes out through faucet *q* into the vessel, while the liquid from reservoir circulates through pipes *x* and *y*.

The operation is as follows: The vessels are spaced apart a distance which, with the speed of rotation, will enable the following operations to take place: The vessel *f* at the point *z* is filled with the cellulose material, for instance, cotton. When it reaches the proper point, the pipe *p* is swung so that the spout *q* is over this vessel and the valve *r* opened, and a measured quantity of the nitrating liquid fed into the vessel. The valve *r* is then closed, and the valve *s* opened and the pipe *n* swung so that the spout is free from vessel *f* and the measurer fills up again, the time of passage of the next succeeding vessel *f* to the proper point to receive the liquid, being sufficient to enable this to be done. The platform then rotates until the vessel reaches the point for tilting the vessel, which gives sufficient time for the nitration. At this point the projection 3 strikes the star wheel, opening the valve *i*, opening the pipe *h*, and the liquid drains off into the tank 4. At the point 5, the vessel is in line with the extractor and the handle *m* being used, the vessel *f* may be tilted to allow the nitrated cotton to pass into the extractor, where the remainder of the liquid is removed. Just before this point, a projection 6 strikes the star wheel *j*, moving it farther and closing the valve *i*.

By this construction the nitration is carried on continuously and the removal of the excess liquid and nitrated cellulose readily obtained. Moreover, small units are acted on, thus lessening the chance of spontaneous combustion and, if it should occur, limiting it to a small quantity. The pump 20 causes a circulation of the acids through pipes $x$ and $y$, when the valve $s$ is closed or measurer $o$ filled.

Having now fully described our invention, what we claim and desire to protect by Letters Patent is:

1. In an apparatus for nitrating cellulose, in combination, a rotating platform, a vessel carried by said platform, said vessel having sections, perforated material between said sections, there being an outlet from the lower section, a valve controlling said outlet, and a fixed device adapted, in the movement of the platform, to open said valve.

2. In an apparatus for nitrating cellulose, in combination, a rotating platform, a vessel carried by said platform, said vessel having sections, perforated material between said sections, there being an outlet from the lower section, a valve controlling said outlet, and a fixed device adapted, in the movement of the platform, to open said valve, and a second fixed device adapted, in the movement of the platform, to close said valve.

3. In an apparatus for nitrating cellulose, in combination, a rotating platform, a vessel, pivotally mounted, carried by said platform, said vessel having sections, perforated material between said sections, there being an outlet from the lower section, a valve controlling said outlet, and a fixed device adapted, in the movement of the platform, to open said valve.

4. In an apparatus for nitrating cellulose, in combination, a rotating platform, a vessel, pivotally mounted, carried by said platform, said vessel having sections, perforated material between said sections, there being an outlet from the lower section, a valve controlling said outlet, a fixed device adapted, in the movement of the platform, to open said valve, and a second fixed device adapted in the movement of the platform, to close said valve.

5. In an apparatus for nitrating cellulose, in combination, a rotating platform, a plurality of equi-spaced vessels mounted upon said platform, each vessel having sections, perforated material between said sections, there being an outlet from the lower section, a valve controlling said outlet, and a fixed device adapted in the movement of the platform, to open said valve.

6. In an apparatus for nitrating cellulose, in combination, a rotating platform, a plurality of equi-spaced vessels, mounted upon said platform, each vessel having sections, perforated material between said sections, there being an outlet from the lower section, a valve controlling said outlet, a fixed device adapted in the movement of the platform, to open said valve, and a second fixed device adapted in the movement of the platform, to close said valve.

7. In an apparatus for nitrating cellulose, in combination, a rotating platform, a plurality of equi-spaced vessels, pivotally mounted upon said platform, each vessel having sections, perforated material between said sections, there being an outlet from the lower section, a valve controlling said outlet, and a fixed device adapted in the movement of the platform, to open said valve.

8. In an apparatus for nitrating cellulose, in combination, a rotating platform, a plurality of equi-spaced vessels, pivotally mounted upon said platform, each vessel having sections, perforated material between said sections, there being an outlet from the lower section, a valve controlling said outlet, and a fixed device adapted in the movement of the platform, to open said valve, and a second fixed device adapted in the movement of the platform to close said valve.

9. In an apparatus for nitrating cellulose, the combination with a nitrating vessel, of a reservoir, a measurer, a pipe leading from said reservoir and terminating in said measurer, an independent delivery pipe, rotatably mounted, leading from the measurer, and a valve on said pipe, said last mentioned pipe being adapted to aline with the nitrating vessel.

10. In an apparatus for nitrating cellulose, the combination with a nitrating vessel, of a reservoir, a measurer, a pipe leading from said reservoir and terminating in said measurer, a valve upon said pipe, an independent delivery pipe, rotatably mounted, leading from the measurer, and a valve on said pipe, said valves being oppositely set, said last mentioned pipe being adapted to aline with the nitrating vessel.

11. In an apparatus for nitrating cellulose, the combination with a nitrating vessel, of a fixed reservoir, a measurer, a pipe leading from said reservoir and terminating in said measurer, a valve on said pipe, an independent delivery pipe leading from the measurer, and a valve on said pipe, said valves being oppositely set and interconnected, said last mentioned pipe being adapted to aline with the nitrating vessel.

12. In an apparatus for nitrating cellulose, the combination with a nitrating vessel, a rotatable central pipe, a measurer connected to said pipe, a reservoir, a pipe leading from said reservoir to said central pipe, a delivery pipe from said measurer, a valve in said pipe, and a valve in the central pipe, the outlet of said delivery pipe being adapted to aline with the nitrating vessel.

13. In an apparatus for nitrating cellulose, the combination with a nitrating vessel, a rotatable central pipe, a measurer connected to said pipe, a reservoir, a pipe leading from said reservoir to said central pipe, a delivery pipe from said measurer, a valve in said pipe, and a valve in the central pipe, said valves being oppositely set, the outlet of said delivery pipe being adapted to aline with the nitrating vessel.

14. In an apparatus for nitrating cellulose, the combination with a nitrating vessel, a rotatable central pipe, a measurer connected to said pipe, a reservoir, a pipe leading from said reservoir to said central pipe, a delivery pipe from said measurer, a valve in said pipe, and a valve in the central pipe, said valves being oppositely set and interconnected, the otulet of said delivery pipe being adapted to aline with the nitrating vessel.

15. In an apparatus for nitrating cellulose, the combination with a nitrating vessel, of a rotatable central pipe, a measurer connected to said pipe, a reservoir, a pipe leading from the lower portion of said reservoir to said central pipe, a delivery pipe from said measurer, a second pipe from the upper portion of the reservoir to the central pipe, a valve on the central pipe between the measurer and the pipes from the reservoir, and a valve in the delivery pipe, the outlet of said delivery pipe being adapted to aline with the nitrating vessel.

16. In an apparatus for nitrating cellulose, the combination with a nitrating vessel, of a rotatable central pipe, a measurer connected to said pipe, a reservoir, a pipe leading from the lower portion of said reservoir to said central pipe, a delivery pipe from said measurer, a second pipe from the upper portion of the reservoir to the central pipe, a valve on the central pipe between the measurer and the pipes from the reservoir, and a valve in the delivery pipe, said valves being oppositely set, the outlet of said delivery pipe being adapted to aline with the nitrating vessel.

17. In an apparatus for nitrating cellulose, the combination with a nitrating vessel, a rotatable central pipe, a measurer connected to said pipe, a reservoir, a pipe leading from the lower portion of said reservoir to said central pipe, a delivery pipe from said measurer, a second pipe from the upper portion of the reservoir to the central pipe, a valve on the central pipe between the measurer and the pipes from the reservoir, and a valve in the delivery pipe, said valves being oppositely set and interconnected, the outlet of said delivery pipe being adapted to aline with the nitrating vessel.

18. In an apparatus for nitrating cellulose the combination with a rotatable platform, and a plurality of vessels pivotally mounted on said platform, of a liquid extractor adjacent to said platform, and in line with the vessels when tilted.

19. In an apparatus for nitrating cellulose the combination with a rotatable platform, and a plurality of vessels pivotally mounted on said platform, a perforated division above the bottom of each vessel, an outlet below said perforated division, a valve controlling said outlet, a liquid extractor adjacent to said platform, and in line with said vessel when tilted, a fixed device in advance of said extractor, in the rotation of the platform and adapted to operate the outlet valves to open.

20. In an apparatus for nitrating cellulose the combination with a rotatable platform, and a plurality of vessels pivotally mounted on said platform, a perforated division above the bottom of each vessel, an outlet below said perforated division, a valve controlling said outlet, a liquid extractor adjacent to said platform, and in line with said vessel when tilted, a fixed device in advance of said extractor, in the rotation of the platform and adapted to operate the outlet valves to open, and a second fixed device beyond said first fixed device but in advance of the extractor and adapted to close said outlet valve.

21. In an apparatus for nitrating cellulose, the combination with a revoluble vessel, of a central pipe, a measurer in connection with said pipe, a reservoir, a pipe from the lower portion of the reservoir to said central pipe, and a second pipe from the central pipe to the upper portion of the reservoir.

22. In an apparatus for nitrating cellulose, the combination with a revoluble vessel, of a central pipe, a measurer in connection with said pipe, a reservoir, a pipe from the lower portion of the reservoir to said central pipe, a second pipe from the central pipe to the upper portion of the reservoir, and a circulating pump in the circuit of said last mentioned pipes.

23. In an apparatus for nitrating cellulose, the combination with a revoluble vessel, of a central pipe, a measurer in connection with said pipe, a reservoir, a pipe from the lower portion of the reservoir to said central pipe, a second pipe from the central pipe to the upper portion of the reservoir, and a valve for controlling the connection between said central pipe and measurer.

24. In an apparatus for nitrating cellulose, the combination with a revoluble vessel, of a central pipe, a measurer in connection with said pipe, a reservoir, a pipe from the lower portion of the reservoir to said central pipe, a second pipe from the central pipe to the upper portion of the reservoir, a valve for controlling the connection between said central pipe and measurer, and a circulating pump in the circuit of said last mentioned pipes.

25. In an apparatus for nitrating cellulose, the combination with a revoluble vessel, of a central pipe, a measurer in connection with said pipe, a reservoir, a pipe from the reservoir to said central pipe, a second pipe from the central pipe to the reservoir, a pipe leading from the measurer, and a valve on said pipe.

26. In an apparatus for nitrating cellulose, the combination with a revoluble vessel, of a central pipe, a measurer in connection with said pipe, a reservoir, a pipe from the reservoir to said central pipe, a second pipe from the central pipe to the reservoir, a pipe leading from the measurer, a valve on said pipe, and a valve for controlling the connection between said central pipe and measurer.

27. In an apparatus for nitrating cellulose, the combination with a revoluble vessel, of a central pipe, a measurer in connection with said pipe, a reservoir, a pipe from the reservoir to said central pipe, a second pipe from the central pipe to the reservoir, a pipe leading from the measurer, a valve on said pipe, a valve for controlling the connection between said central pipe and measurer, and a circulating pump in the circuit of pipes between the reservoir and the central pipe.

In testimony of which invention, we have hereunto set our hands, at Carney's Point, N. J., on this 5th day of January, 1910.

ALEXIS FELIX DU PONT.
JOHN TORBERT THOMPSON.

Witnesses:
  O. V. ORT,
  HARRY DAVENPORT.